United States Patent Office 3,629,256
Patented Dec. 21, 1971

3,629,256
HERBICIDAL 2-ALKYLTHIO-4,6-DIAMINO-S-TRIAZINES
Dagmar Berrer, Riehen, and Christian Vogel, Binningen, near Basel, Switzerland, assignors to Geigy Chemical Corporation, Ardsley, N.Y.
No Drawing. Filed Mar. 14, 1969, Ser. No. 807,429
Claims priority, application Switzerland, Mar. 20, 1968, 4,150/68
Int. Cl. C07d 55/20
U.S. Cl. 260—249.8           5 Claims

ABSTRACT OF THE DISCLOSURE 2-alkylthio-triazine derivatives of the formula

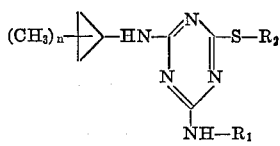

wherein $n$ means 0 or 1, $R_1$ represents certain unsubstituted or substituted alkyl or cycloalkyl groups and $R_2$ represents methyl or ethyl are disclosed as herbicidally active compounds of enhanced toxicity to undersirable plant growth and improved selectivity. A method of controlling undesirable plant growth with the aid of such compounds and compositions containing them are also described.

DESCRIPTION OF THE INVENTION

The present invention concerns new 2-alkylthio-4,6-diamino-derivatives, processes for the production thereof, the use of the new triazines for the, preferably, selective control of weeds and wild grasses, also compositions containing these new active substances and which are used for controlling weeds and wild grasses, and processes for the control of weeds and wild grasses using the new active substances or the compositions containing the latter, 2-alkylthio-4,6-diamino-s-triazines are already known, e.g. from British Pat. No. 814,948.

2-alkylthio-4,6-diamino-s-triazines of the Formula I,

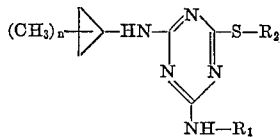

wherein:

$R_1$ represents methyl, ethyl, isopropyl, cyclopropyl, 1-methyl cyclopropyl, sec-butyl, tert-butyl, isobutyl, isopentyl, β-methoxy-ethyl, γ-methoxy-n-propyl, 1-cyanoethyl-(1), 1-cyanoprop-(1)-yl, 2-cyanoprop-(2)-yl, 2-cyanobut-(2)-yl or 3-cyanopent-(3)-yl,
$R_2$ represents methyl or ethyl, and
$n$ represents 0 or 1, on the contrary have not been hitherto described.

The new s-triazines of the Formula I are obtained according to the present invention by reacting a 2-chloro-s-triazine of the Formula II,

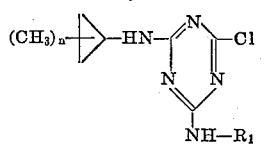

wherein $R_1$ and $n$ have the meanings given under Formula I, with thiourea and dimethyl sulphate or diethyl sulphate in the presence of basic substances. It is advantageous to perform the reactions in the presence of a solvent or diluent.

Examples of the latter are water, aliphatic and aromatic hydrocarbons and halogen hydrocarbons, as well as ethers, ethereal compounds, nitriles, amides, ketones or mixtures of these solvents with each other and with water. Both organic and inorganic basic substances are applicable for the process according to the invention. Preferably, inorganic bases such as alkali metal hydroxides and alkaline-earth metal hydroxides are used, but also oxides and carbonates thereof. The new s-triazines of the Formula I can also be produced by reacting a 2-chloro-s-triazine of the Formula II with methyl or ethyl mercaptan in the presence of an acid-binding agent, e.g. a tertiary amine, an alkali metal hydroxide or alkali metal alcoholate, and an organic solvent or diluent which is inert to the reactants, in particular an alkanol.

Furthermore, the new s-triazines of the Formula I can be produced by reacting cyanuric chloride with one of the amines of the Formula IIIa or IIIb,

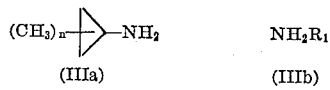

wherein $R_1$ and $n$ have the meanings given under Formula I, and converting the dichloramino-s-triazine derivative, obtained as intermediate product, with methyl or ethyl mercaptan in the presence of an acid-binding agent, or with an alkali metal salt of such a mercaptan, into a corresponding methylthio or ethylthio-chloramino-s-triazine derivative, which is then reached with the other amine, not used in the first stage, of the Formula IIIa or IIIb in the presence of an acid-binding agent.

The new 2-alkylthio-4,6-diamino-s-triazines of the Formula I possess excellent herbicidal properties and are especially suitable for the selective control of weeds and wild grasses in cultivated plantations of the most varied kinds. The s-triazines according to the invention are superior to the herbicidal s-triazines hitherto known by virtue of their appreciably more rapid action, even in lower concentrations (0.1 kg./hectare–1 kg./hectare), and by virtue also of the absence of phytotoxicity, even with high concentrations (3 kg./hectare and above), with respect to some important cultivated plants, especially maize. The new s-triazines can be used both as pre-emergence herbicides and as post-emergence herbicides for the control of mono- and di-cotyl weeds and wild grasses. Tests have shown that the new active substances can be used to destroy, e.g., field weeds which are difficult to destroy and representative varieties thereof: such as species of millet (Panicum sp.), species of mustard (Sinapis sp.), species of goosefoot (Cheneopodiaceae), also of grasses (Gramineae), umbel growth (Umbelliferae) and species of camomile (Matricariae), whereby they do not impair either in germination or growth, useful plants such as grain, maize, root vegetables, oil-plants, vegetables, cotton, sorghum, soya beans and lucern.

Herbicidal compositions are produced by mixing the active substances with suitable carriers and/or dispersing agents. In order to widen the range of activity of the triazine derivatives according to the invention, other herbicides can be added to these compositions, e.g. herbicides from the series of triazines such as other halogene-diamine-s-triazines, alkoxy and alkylthio-diamine-s-triazines, triazoles, diazines such as uracils, aliphatic carboxylic acids and halogen carboxylic acids, halogenated benzoic acids and phenyl acetic acids, aryloxyalkane carboxylic acids, hydrazides, amides, nitriles, esters of such carboxylic acids, carbamic acid and thiocarbamic acid esters, ureas, etc.

The following tests serve to illustrate the herbicidal action of the new s-triazine derivatives compared with known herbicidal s-triazines.

(1) HERBICIDAL ACTION ON MILLET IN MAIZE BY POST-EMERGENCE APPLICATION

In a greenhouse, maize and millet are sown 0.5 cm. deep in sterile soil. In the 2-3-leaf stage, the plants are sprayed on a spraying-bench with dispersions of active substances. The treated plants are then kept in an air-conditioned chamber in daylight at 22° C. and 70% relative humidity.

The evaluation of the results is made after 8, 15 or 21 days according to the following scale:

0—plants undamaged
1—slight damage
2—50% of plants damaged
3—75% of plants damaged
4—plants destroyed The respective amounts in which the active substances were applied (kg./hectare) and the length of the tests (in days) are given at the top of the tables. The active substance dispersions had the following composition: 25 parts of active substance, 8.5 parts of lignin sulphonic acid calcium salt, 1.5 parts of adhesive (1:1 polyvinyl-pyrrolidon:Champagne chalk), 32 parts of kaolin, 33 parts of Champagne chalk-dispersed in an amount of water corresponding to 1000 litres per hectare.

TABLE 1

| Compound | Action on millet after 8 days | |
|---|---|---|
| | 0.2 kg./ha. | 0.5 kg./ha. |
| 2-methylthio-4-ethylamino-6-cyclopropylamino-s-triazine | 4 | 4 |
| 2-methylthio-4-sec.-butylamino-6-cyclopropylamino-s-triazine | 3.5 | 3.5 |
| 2-methylthio-4-(γ-methoxypropylamino)-6-cyclopropylamino-s-triazine | 4.0 | 4.0 |
| 2-methylthio-4,6-bis-cyclopropylamino-s-triazine | 4.0 | 4.0 |
| 2-chlor-4-ethylamino-6-isopropylamino-s-triazine (British Patent No. 814,947) | 0 | 0 |
| 2-chloro-4,6-bis-ethylamino-s-triazine (British Patent No. 814,947) | 0 | 0 |
| 2-methylthio-4,6-bis-isopropylamino-s-triazine (British Patent No. 814,948) | 1.5 | 3 |

TABLE 2

| Compound | Action on millet in maize after 15 days with 1 kg./ha. | |
|---|---|---|
| | Maize | Millet |
| 2-methylthio-4-methylamino-6-cyclopropylamino-s-triazine | 0 | 4 |
| 2-ethylthio-4-isopropylamino-6-cyclopropylamino-s-triazine | 0.5 | 4 |
| 2-methylthio-4-(γ-methoxypropylamino)-6-cyclopropylamino-s-triazine | 0.5 | 4 |
| 2-chloro-4-ethylamino-6-isopropylamino-s-triazine (British Patent No. 814,947) | 0 | 0 |
| 2-methylthio-4,6-bis-isopropylamino-s-triazine (British Patent No. 814,948) | 1.5 | 4 |

TABLE 3

| Compound | Action on millet in maize after 15 days with 2.5 kg./ha. | |
|---|---|---|
| | Maize | Millet |
| 2-methylthio-4-methylamino-6-cyclopropylamino-s-triazine | 0.5 | 4 |
| 2-ethylthio-4-ethylamino-6-cyclopropylamino-s-triazine | 0 | 4 |
| 2-methylthio-4-sec.-butylamino-6-cyclopropylamino-s-triazine | 1 | 4 |
| 2-chloro-4-ethylamino-6-isopropylamino-s-triazine (British Patent No. 814,947) | 0 | 0.25 |
| 2-methylthio-4,6-bis-isopropylamino-s-triazine (British Patent No. 814,948) | 2 | 4 |

TABLE 4

| Compound | Action on millet (B) in maize (A) after 21 days, with: | | | | | | | |
|---|---|---|---|---|---|---|---|---|
| | 0.2 kg./ha. | | 0.5 kg./ha. | | 2 kg./ha. | | 3 kg./ha. | |
| | A | B | A | B | A | B | A | B |
| 2-methylthio-4-isopropylamino-6-cyclopropylamino-s-triazine | 0 | 4 | | | | | | |
| 2-methylthio-4,6-bis-cyclopropylamino-s-triazine | | | 0 | 4 | | | | |
| 2-methylthio-4-methylamino-6-cyclopropylamino-s-triazine | | | | | 0.5 | 4 | | |
| 2-methylthio-4-tert.butylamino-6-cyclopropylamino-s-triazine | | | | | | | 0 | 4 |
| 2-chloro-4-ethylamino-6-isopropylamino-s-triazine (British Patent No. 814,947) | 0 | 1 | 0 | 0 | 0 | 0 | 0 | 2.5 |
| 2-methylthio-4,6-bis-isopropylamino-s-triazine (British Patent No. 814,948) | | | 1 | 4 | 2 | 4 | 1 | 4 |

As can be seen from the test results, the new s-triazine derivatives of the Formula I effect a 100% destruction of the millet when used in lower concentrations, whereby, in the same concentrations, the known herbicidal triazines, such as 2-chloro-4-ethylamino-6-isopropylamino-s-triazine, 2-chloro-4,6-bis-ethylamino-s-triazine and 2-methylthio-4,6-bis-isopropylamino-s-triazine have no destructive action. The tests with usual concentrations (see Tables 2 and 3) show that the s-triazines according to the invention, have practically no harmful effect on the cultivated maize plant, whereas 2-methylthio-4,6-bis-isopropylamino-s-triazine causes appreciable damage and 2-chloro-4-ethylamino-6-isopropylamino-s-triazine, in these concentrations, exhibits no effect against weeds. Table 4 clearly shows that the new herbicides in the various concentrations, in contrast to 2-chloro-4-ethylamino-6-isopropylamino-s-triazine and 2-methylthio-4,6-bis-isopropylamino-s-triazine can be very successfully applied.

(2) HERBICIDAL ACTION ON WEEDS BY POST-EMERGENCE APPLICATION

Test plants: camomile, ray grass and pastinaca

The test procedure was as described under (1) with regard to millet. The active substance dispersions had the same composition and were dispersed in the same manner. The control evaluation was made on the same basis as under (1). At the top of Tables 5 and 6 are figures relating to the amounts applied and the length of the tests.

TABLE 5

| Compound | Camomile, 11 days | | Ray grass, 15 days |
|---|---|---|---|
| | 0.2 kg./ha. | 0.5 kg./ha. | 0.2 kg./ha. |
| 2-methylthio-4-isopropylamino-6-cyclopropylamino-s-triazine | 4 | 3.5 | 3.5 |
| 2-methylthio-4-ethylamino-6-cyclopropylamino-s-triazine | 4 | 4 | 4 |
| 2-methylthio-4-sec.-butylamino-6-cyclopropylamino-s-triazine | 3 | 4 | 3.5 |
| 2-methylthio-4-(γ-methoxypropylamino)-6-cyclopropylamino-s-triazine | 4.0 | 4.0 | |
| 2-methylthio-4-methylamino-6-cyclopropylamino-s-triazine | 4.0 | 4.0 | 4.0 |
| 2-methylthio-4,6-bis-cyclopropylamino-s-triazine | 4.0 | 4.0 | |
| 2-chloro-4-ethylamino-6-isopropylamino-s-triazine (British Patent No. 814,947) | 0 | 0 | 2.5 |
| 2-chloro-4,6-bis-ethylamino-s-triazine (British Patent No. 814,947) | 0 | 0 | 0 |
| 2-methylthio-4,6-bis-isopropylamino-s-triazine (British Patent No. 814,948) | 0 | 0 | 2 |

TABLE 6

| Compound | Pastinaca | | | | | | | | | |
|---|---|---|---|---|---|---|---|---|---|---|
| | 5 kg./ha. for— | | 3 kg./ha. for— | | 2 kg./ha. for— | | 1 kg./ha. for— | | 0.5 kg./ha. for— | |
| | 11 days | 28 days | 11 days | 28 days | 11 days | 28 days | 11 days | 28 days | 11 days | 28 days |
| 2-methylthio-4-isopropylamino-6-cyclopropylamino-s-triazine | 3.5 | 4 | 3.5 | 4 | 4 | 4 | 4 | 4 | 4 | 4 |
| 2-methylthio-4-ethylamino-6-cycloporpylamino-s-triazine | | | 2 | 4 | 3 | 4 | 2 | 4 | 4 | 4 |
| 2-methylthio-4,6-bis-isopropylamino-s-triazine (British Patent No 814,948) | 0.5 | 3.5 | 0 | 0 | 0 | 0 | 0 | 0 | 0 | 0 |
| 2-chloro-4-ethylamino-6-isopropylamino-s-triazine (British Patent No. 814,947) | 1.5 | 3.5 | 1.5 | 3.5 | 0 | 1.5 | 0 | 0 | 0 | 0 |

It becomes clear from the preceding results that the s-triazines according to the invention will effect a 100% destruction of camomile and ray grass even after a few days with application of lower concentrations, whereas this does not apply to the same extent when using the known herbicides which were tested as comparative active substances. Even where the amounts applied exceed the amounts normally applied in practice, the known herbicides did not attain the degree of effectiveness of the new s-triazines.

With the application of 5 kg./hectare, 2-methylthio-4,6-bis-isopropylamino-s-triazine and 2-chloro-4-ethylamino-6-isopropylamino-s-triazine exhibit only after 28 days the effect which is produced by the new triazines even after 11 days and in considerably lower concentrations. With the high application amount of 5 kg./hectare, however, cultivated plants are severely damaged, as was shown by the example of maize in the tests described. The new substances have, therefore, an extraordinarily selective action and are superior to the previously known herbicides from the triazine series.

(3) SELECTIVITY FIELD TESTS

In the following tests the evaluation for the cultivated plants and the weeds sown is made according to the following scale:

1=no symptoms or damage (same as untreated plants)
2–4=logarithmic increase of the reversible phytotoxic symptoms
5–8=logarithmic increase of the irreversible phytotoxic symptoms
9=plants completely destroyed The herbicidal activity on indigenous weeds (*Chenopodium album, Polygonum convolvulus, Polygonum persicaris, Capsella bursa pastoris* and *Sinapis arvensis*) is given in percent, whereby 100% =weeds completely destroyed
0% =no damage (same as untreated plants)

Pre-emergence test

*Method.*—The test plants (cabbage, wheat and oats) are sown in a freshly prepared seed bed. Hereupon the active substance to be tested is applied to the bed as an aqueous dispersion prepared from a 25% wettable powder in a ratio of 110 ml. dispersion per square meter of soil. The phytotoxic activity is determined for both cultivated plants and weeds 62 days after application of the active substance.

Compounds tested (I) 2-methylthio-4-isopropylamino-6-cyclopropylamino-s-triazine (according to the invention)
(II) 2-methylthio-4-isopentylamino-6-cyclopropylamino-s-triazine (according to the invention)
(III) 2-methylthio-4,6-bis-isopropylamino-s-triazine (British Patent No. 814,948)

Results

TABLE 7

| Compound | Plant | Concentration, kg./ha. | | | |
|---|---|---|---|---|---|
| | | 2.5 | 2 | 1.5 | 1 |
| I | Cabbage | 3 | 3 | 3 | 1 |
| III | do | 9 | 9 | 5 | 5 |
| I | Wheat | 3 | 2 | 2 | 1 |
| III | do | 7 | 6 | 6 | 6 |
| I | Oats | 1 | 1 | 1 | 1 |
| III | do | 7 | 6 | 6 | 6 |
| | | Effect in percent | | | |
| I | Indigenous weeds | 98 | 98 | 90 | 90 |
| III | do | 100 | 98 | 95 | 82 |

TABLE 8

| Compound | Effect at 3 kg./ha. on— | | | Effect in percent on indigenous weeds |
|---|---|---|---|---|
| | Cabbage | Wheat | Oats | |
| I | 3 | 3 | 1 | 98 |
| II | 1 | 1 | | 95 |
| III | 9 | 8 | 8 | 100 |

As can be seen from the test results of Table 7 with the same herbicidal effect on the indigenous weeds, the damage caused by the known compound is irreversible, while the new compounds, cause only reversible phytotoxic symptoms. From the results of Table 8 it is clear, that also at higher concentrations the new compounds practically do not injure the cultivated plants.

The following examples describe the production of the new s-triazines of the Formula I. Following the example is a table containing the 2-alkylthio-4-substituted amino-6-cyclopropyl-amino-s-triazines obtained in the same manner using equimolar amounts of corresponding chloro-bis-amino-s-triazines, thiourea and corresponding dialkyl sulphates.

Temperatures are given in degrees centigrade and melting points are not corrected.

EXAMPLE 1

10.7 g. of 2-chloro-4-ethylamino-6-cyclopropylamino-s-triazine, 61.5 ml. of 15% aqueous hydrochloric acid and 4 g. of thiourea are mixed, while stirring, with 66.4 g. of 30% aqueous sodium hydroxide solution and subsequently with 31.5 ml. of water. This mixture is then mixed with 7.9 g. of dimethyl sulphate and heated, while stirring, for 4 hours at 70°. After cooling, the obtained precipitate is separated, repeatedly washed with water and dried. The 2-methylthio-4-ethylamino-6-cyclopropyl-amino-s-triazine has the melting point 101–104° after recrystallisation from methanol/water.

EXAMPLE 2

95 g. of 2-chloro-4-[2'-cyanoprop-(2')-ylamino]-6-cyclopropylamino-s-triazine are dissolved at 20° in 600 ml. of acetone. To the solution are then added, while stirring, 63 g. of a 40% aqueous trimethylamine solution, whereby the temperature rises to 30°. After 15 hours a solution of 21 g. of methylmercaptan in 100 ml. of acetone is added dropwise at 10–20° to the trimethylammonium compound formed. This mixture is then stirred at room temperature until the reaction is completed, and on addition of water the methylthio compound precipitates. The 2-methylthio-4-[2'-cyanoprop-(2')-ylamino]-6-cyclopropylamino-s-triazine melts after recrystallisation from benzene petrolether at 135–136°.

The starting 2-chloro-4-[2'-cyanoprop-(2')-ylamino]-6-cyclopropylamino-s-triazine used in the above reaction is prepared by adding, while stirring, a solution of 17.1 g. of cyclopropylamine in 20 ml. of water to a solution of 69.3 g. of 2,6-dichloro-4-[2'-cyanoprop-(2')-ylamino]-s-triazine in 400 ml. of acetone. To this mixture is added at 20–25° a solution of 12 g. of sodium hydroxide in 30 ml. of water. The reaction mixture is then stirred at room temperature until the mixture is neutral, the solvent is distilled off under vacuo. To the residue water is added and the precipitate formed is filtered and washed with water. The 2-chloro-4[2'-cyanoprop-(2')-ylamino]-6-cyclopropylamino-s-triazine obtained melts after recrystallisation from benzene at 169–172°.

EXAMPLE 3

37.5 ml. of acetone and 37.5 ml. of water are added to 18.4 g. of cyanuric chloride and after cooling, 5.8 g. of isopropylamine are added at temperatures between −10° and 0° to this mixture. Hereafter 25 ml. of a 4 N sodium hydroxide solution are put into the reaction mixture and the whole is stirred until the mixture is neutral. 35 ml. of a 20% sodium methylmercaptide solution are then added dropwise to the neutral mixture, and the whole again stirred until the mixture is neutral. Then 5.7 g. of cyclopropylamine are added to the mixture and the whole is refluxed for two hours. After cooling, the crystals formed are filtered, washed with water and dried in vacuo. The 2-methylthio-4-isopropylamino-6-cyclopropylamino-s-triazine obtained has a melting point of 115–116°.

In the same manner as described in the foregoing examples, the following compounds are obtained:

| Compound | M.P.=melting point<br>B.P.=boiling point |
|---|---|
| 2-methylthio-4-methylamino-6-cyclopropylamino-s-triazine. | M.P. 113–117°. |
| 2-methylthio-4-isopropylamino-6-cyclopropylamino-s-triazine. | M.P. 114–116°. |
| 2-methylthio-4,6-bis-cyclopropylamino-s-triazine. | M.P. 111–115°. |
| 2-methylthio-4-sec.butylamino-6-cyclopropylamino-s-triazine. | M.P. 73–78°. |
| 2-methylthio-4-tert.butylamino-6-cyclopropylamino-s-triazine. | M.P. 126–128°. |
| 2-methylthio-4-(β-methoxy-ethylamino)-6-cyclopropylamino-s-triazine. | M.P. 91–94°. |
| 2-methylthio-4-(γ-methoxypropylamino)-6-cyclopropylamino-s-triazine. | M.P. 79–81°. |
| 2-ethylthio-4-ethylamino-6-cyclopropylamino-s-triazine. | M.P. 63–66°. |
| 2-ethylthio-4-isopropylamino-6-cyclopropylamino-s-triazine. | M.P. 81–83°. |
| 2-methylthio-4-isopropylamino-6-(1'-methylcyclopropylamino)-s-triazine. | |
| 2-methylthio-4-ethylamino-6-(1'-methylcyclopropylamino)-s-triazine. | |
| 2-ethylthio-4-ethylamino-6-(1'-methylcyclopropylamino)-s-triazine. | |
| 2-methylthio-4-tert.butylamino-6-(1'-methylcyclopropylamino)-s-triazine. | |
| 2-methylthio-4-[2'-cyanoprop-(2')-ylamino]-6-cyclo-propylamino-s-triazine. | |
| 2-methylthio-s-[2'-cyanoprop-(2')-yl-amino]-6-cyclopropylamino-s-triazine. | M.P. 135–136°. |

TABLE.—Continued

| Compound | M.P.=melting point<br>B.P.=boiling point |
|---|---|
| 2-ethylthio-4-[2'-cyanoprop-(2')-yl-amino]-6-cyclopropylamino-s-triazine. | |
| 2-ethylthio-4,6-bis-cyclopropylamino-s-triazine. | B.P. 143–158°/0.0001 Torr. |
| 2-ethylthio-4-(1'-methylcyclopropyl-amino)-6-cyclopropylamino-s-triazine. | |
| 2-ethylthio-4-(γ-methoxy-n-propylamino)-6-cyclopropylamino-s-triazine. | B.P. 171–174°/0.0001 Torr. |
| 2-methylthio-4-(β-methoxy-ethylamino)-6-cyclopropylamino-s-triazine. | |
| 2-ethylthio-4-tert.butylamino-6-cyclopropylamino-s-triazine. | |
| 2-methylthio-4-isobutylamino-6-cyclopropylamino-s-triazine. | B.P. 153–156°/0.005 Torr. |
| 2-methylthio-4-isopentylamino-6-cyclopropylamino-s-triazine. | B.P. 161°/0.0001 Torr. |
| 2-methylthio-4-isopropylamino-6-(2'-methylcyclopropylamino)-s-triazine. | Oil. |
| 2-methylthio-4-[2'-cyanoprop-(2')-yl-amino]-6-cyclopropylamino-s-triazine. | |
| 2-methylthio-4-[3'-cyanopent-(3')-yl-amino]-6-cyclopropylamino-s-triazine. | |
| 2-methylthio-4-[1'-cyanoethyl-(1')-amino]-6-cyclopropylamino-s-triazine. | |
| 2-methylthio-4-[1'-cyanoprop-(1')-yl-amino]-6-cyclopropylamino-s-triazine. | |
| 2-methylthio-4-tert.butylamino-6-(2'-methylcyclopropylamino)-s-triazine. | |
| 2-methylthio-4-[2'-cyanoprop-(2')-yl-amino]-6-(2''-methylcyclopropylamino)-s-triazine. | |

The production of herbicidal composition according to the invention is carried out in known manner by mixing and grinding active substances of the general Formula I with suitable carriers, optionally with the addition of dispersing agents or solvents which are inert to the active substances. The active substances can exist and be used in the following forms:

as solids: sprinkling agents, granulates, coated granules, impregnated granules and homogeneous granules;
as concentrates of active substances dispersible in water: wettable powder, pastes, emulsions;
as liquids: solutions.

The solid forms (sprinkling agents, granulates) are produced by mixing the active substances with solid carriers. The grain size of the carriers for sprinkling agents is about 0.075 to 0.2 mm. and for granulates it is 0.2 mm. or above. The concentrations of active substance in the solid preparations are as a rule 0.5 to 80% by weight. To these mixtures can also be added additives which stabilise the active substance and/or non-ionic as well as anion-active substances which, for example improve the adhesion of the active substances on plants and parts of plants (glues and adhesives) and/or ensure a better wettability (wetting agents) and also dispersibility (dispersing agents). Concentrates of active substances which can be dispersed in water, i.e. wettable powders, pastes and emulsion concentrates, are agents which can be diluted with water to give any desired concentration. They consist of active substance, carrier, optionally additives for stabilising the active substance, surface active substances and anti-foaming agents and, optionally, solvents. The concentration of active substance in these agents is 5–80% by weight.

The wettable powders and pastes are obtained by mixing and grinding the active substances with dispersing agents and pulverulent carriers in suitable apparatus until homogeneity is attained. Suitable anti-foaming agents are, e.g. silicones etc. The active substances are so mixed, ground, sieved and strained with the above mentioned additives that the solid particle size in the case of wettable powders does not exceed 0.02–0.04 mm. and in the case of pastes 0.003 mm. Emulsion concentrates and pastes are produced by using dispersing agents, organic solvents and water. The solvents must be practically odorless, not phytoxic, inert to the active substances and not easily inflammable.

Furthermore, the compositions according to the invention can be used in the form of solutions. For this application, the active substance or substances of the general Formula I are dissolved in suitable organic solvents, mixtures of solvents or in water. The solutions are to contain the active substances within a concentration range of 1–20% by weight.

Other biocidal active substances or agents can be mixed with the described agents according to the invention. Thus in addition to the stated compounds of the general Formula I and other herbicides, the new compositions can also contain, e.g. insecticides, fungicides, bactericides fungistatics, bacteriostatics or nematocides, in order to widen the range of action. The compositions according to the invention can also contain fertilisers, trace elements etc.

Forms of preparation of these active substances are described in the following. Unless otherwise expressly stated, all parts and percentages are by weight.

Granulate

The following substances are used to produce a 5% granulate:

| | Parts |
|---|---|
| 2-methylthio-4,6-bis-cyclopropylamino-s-triazine | 5 |
| Epichlorohydrin | 0.25 |
| Cetyl polyglycol ether with 8 mol ethyleneoxide | 0.25 |
| Carboxwax (molecular weight about 400) | 3.50 |
| Kaolin (grain size 0.3–0.8 mm.) | 91 |

The active substance is mixed with epichlorohydrin and dissolved with 6 parts of acetone. Polyglycol and cetyl polyglycol ether are then added. The solution thus obtained is sprayed on to kaolin and the acetone is then evaporated in vacuo.

Wettable powder

The following constituents are used to produce—
(a) a 50% wettable powder,
(b) a 25% wettable powder and
(c) a 10% wettable powder;

(a)

50 parts of 2-methylthio-4-ethylamino-6-cyclopropylamino-s-triazine,
5 parts of sodium dibutyl naphthyl sulphonate,
3 parts of naphthalene sulphonic acid/phenolsulphonic acid/formaldehyde condensate 3:2:1,
20 parts of kaolin,
22 parts of Champagne chalk;

(b)

25 parts of 2-methylthio-4-isopropylamino-6-cyclopropyl-amino-s-triazine,
5 parts of oleyl-methyl tauride-Na-salt,
2.5 parts of naphthalene sulphonic acid/formaldehyde condensate,
0.5 parts of carboxy-methyl cellulose,
5 parts of neutral potassium aluminium silicate,
62 parts of kaolin;

(c)

10 parts of 2-methylthio-4-sec.butylamino-6-cyclopropyl-amino-s-triazine,
3 parts of a mixture of the sodium salts of saturated fatty alcohol sulphates,
5 parts of naphthalene sulphonic acid/formaldehyde condensate,
82 parts of kaolin.

The respective active substance is drawn on to the corresponding carriers (kaolin, chalk) and subsequently mixed and ground. A wettable powder is obtained having excellent wettability and suspension properties. Suspensions of any desired active substance concentration can be prepared from such a wettable powder by diluting with water.

Paste

The following substances are used to produce a 45% paste:

| | Parts |
|---|---|
| 2-methyl-4-($\beta$-methoxy-ethylamino) - 6 - cyclopropyl-amino-s-triazine | 45 |
| Sodium aluminium silicate | 5 |
| Cetyl polyglycol ether with 8 mol ethyleneoxide | 14 |
| Cetyl polyglycol ether with 8 mol ethyleneoxide | 1 |
| Spindle oil | 2 |
| Carbowax (molecular weight about 400) | 10 |
| Water | 23 |

The active substance is intimately mixed and ground with the additives in suitable equipment. A paste is obtained from which, by dilution with water, suspensions of any desired concentration can be produced.

Emulsion concentrate

The following are mixed together to produce a 10% emulsion concentrate:

| | Parts |
|---|---|
| 2 - methylthio-4-tert.butylamino-6-cyclopropylamino-s-triazine | 10 |
| Oleyl polyglycol ether with 8 mol of ethylene oxide | 15 |
| Isophorone (3,5,5-trimethylcyclohex-2-en-1-one) | 75 |

This concentrate can be diluted with water to obtain emulsions of suitable concentrations. Such emulsions are suitable for the controlling of weeds in cultivated plantations, for which purpose application of about 0.5 to 3 kg. of a compound of Formula I per hectare of soil is recommended.

We claim:
1. A compound of the formula

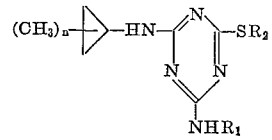

wherein
R$_1$ represents methyl, ethyl, isopropyl, cyclopropyl, 1-methyl cyclopropyl, sec-butyl, tert-butyl, isobutyl, isopenty, $\beta$-methoxy-ethyl, $\gamma$-methoxy-n-propyl, 1-cyanoethyl-(1), 1-cyanoprop-(1)-yl, 2-cyanoprop-(2)-yl, 2-cyanobut-(2)-yl or 3-cyanopent-(3)-yl
R$_2$ represents methyl or ethyl, and
$n$ represents 0 or 1.

2. 2-methylthio - 4 - isopropylamino - 6 - cyclopropyl-amino-s-triazine.

3. 2 - methylthio-4-sec-butylamino-6-cyclopropyl-amino-s-triazine.

4. 2-methylthio - 4 - isopentylamino-6-cyclopropylamino-s-triazine.

5. 2 - methylthio-4-[2'-cyanoprop-(2')-ylamino]-6-cyclopropyl-amino-s-triazine.

References Cited

UNITED STATES PATENTS 2,909,420 10/1959 Gysin et al. ____ 260—249.8X
3,451,802  6/1969 Neighbors et al. __ 260—249.8X JOHN M. FORD, Primary Examiner U.S. Cl. X.R.

71—93